(12) United States Patent
Johnson

(10) Patent No.: US 7,813,744 B2
(45) Date of Patent: Oct. 12, 2010

(54) METHOD FOR DETERMINING DFS CHANNEL AVAILABILITY IN A WIRELESS LAN

(75) Inventor: Paul D. Johnson, Lafayette, CO (US)

(73) Assignee: Polycom, Inc., Pleasanton, CA (US)

( * ) Notice: Subject to any disclaimer, the term of this patent is extended or adjusted under 35 U.S.C. 154(b) by 724 days.

(21) Appl. No.: 11/513,763

(22) Filed: Aug. 31, 2006

(65) Prior Publication Data

US 2008/0056200 A1 Mar. 6, 2008

(51) Int. Cl.
*H04W 88/02* (2009.01)
(52) U.S. Cl. ...................................... 455/464; 455/509
(58) Field of Classification Search .................. 455/1, 455/414, 3.03, 3.04, 456.3, 463.1, 464, 509, 455/529; 370/208, 211, 312, 328–350, 432
See application file for complete search history.

(56) References Cited

U.S. PATENT DOCUMENTS

| | | | |
|---|---|---|---|
| 5,673,307 A * | 9/1997 | Holland et al. | 455/436 |
| 6,496,499 B1 * | 12/2002 | Hamilton et al. | 370/348 |
| 6,904,110 B2 * | 6/2005 | Trans et al. | 375/350 |
| 2005/0128988 A1 * | 6/2005 | Simpson et al. | 370/338 |
| 2006/0214837 A1 * | 9/2006 | Liu et al. | 342/52 |

* cited by examiner

*Primary Examiner*—Diane Mizrahi
(74) *Attorney, Agent, or Firm*—Wong Cabello Lutsch Rutherford & Brucculeri LLP

(57) ABSTRACT

A LAN has a wireless portion which includes access points and wireless communications devices and a wired portion which includes such things as routers, servers, and a PBX. The LAN operates in a radio frequency band where certain channels (DFS channels) are shared with a signal that is of higher priority than the communications signals transmitted and received by the access point and the wireless communications devices. If a higher priority signal is sensed on a particular channel of the wireless medium by a master device, it is necessary for all of the slave devices communicating on this channel to stop transmitting on that channel within a short period of time. The wireless communications devices are mobile and can be easily transported around in space or roam during a communications session. While roaming during a communications session, it is likely that the communications device will move out of range of an access point with which it is currently associated and possibly cause the session to end prematurely, and so it is important that a handoff procedure operates so that a communications session is continuous as the communications device roams from access point to access point. By setting and maintaining a timer dedicated to each available DFS channel, it is possible to ensure that the communications sessions is not interrupted during the roaming process in an environment were certain channels are shared with a higher priority signal.

17 Claims, 7 Drawing Sheets

DCA State Machine 40

US 7,813,744 B2

METHOD FOR DETERMINING DFS CHANNEL AVAILABILITY IN A WIRELESS LAN

FIELD OF THE INVENTION

This invention generally lies in the area of wireless communication technology for a local area network that shares the same frequency bands as a radar signal and specifically in the area of a wireless communications device sensing the wireless medium in the frequency bands shared with radar signals in order to identify bands or channels that are available for communicating with an access point.

BACKGROUND OF THE INVENTION

The IEEE standard 802.11a supplement to the IEEE standard 802.11 specification defines how to implement an orthogonal frequency division multiplexing (OFDM) system in the 5.25-5.35, and 5.450-5.705 GHz unlicensed national information structure bands As it happens, these frequency bands are shared by certain radar systems and so it is necessary, and required by the Federal Communications Commission, that all wireless communication devices utilizing these bands be able to sense the presence of a radar signal on a particular channel or channels and then quickly stop transmitting on the channel(s). Specifically, in a wireless LAN that includes a number of access points (APs) that transmit frames to and receive frames from wireless communications devices, it is required that master devices, which could be the APs for instance, are all capable of detecting the presence of radar signals in the 5 GHz frequency spectrum and notifying all of the slave devices, which in this case could be the wireless communications devices, that radar is present in one or more channels and that the slave devices should stop transmitting on those channels. More specifically, prior to establishing a session with a slave wireless communications device, the master devices are required to sense the medium for some minimum, specified time period to determine whether radar signals are present in any particular channel(s). If no radar signal is detected in a particular channel, it is said that this channel is "available" to be utilized by the wireless communications device to establish a communications session. As mentioned above, if a master device detects a radar signal in any particular channel during the minimum, specified period of time, this channel is marked as not available. Furthermore, a slave device is not permitted to transmit frames prior to receiving a signal from a master device indicating that a channel is available for use. This signal could be any qualified signal transmitted by the master device such as a beacon or a probe response for instance.

The protocol described above is generally referred to as dynamic frequency selection (DFS) and it operates in the background of a wireless LAN so as to be largely transparent to the user of a wireless communications device. However, the continuity of a communications session between an AP and an associated wireless communications device can be interrupted in the event that the user of the wireless device moves around in space. Such movement is generally referred to as roaming and it results in the wireless communications devices having to disassociate with a current AP, whose transmission signal quality is deteriorating, and associate with another AP whose signal quality is better than that of the AP it is currently associated with.

The handoff process whereby a wireless communications device becomes disassociated from an AP it is currently communicating with and associates with another AP can be managed by either the AP or by the wireless communications device. Assuming that the process is managed by the wireless communications device, it monitors the channel signal quality with the AP it is currently associated and also monitors the signal quality of a signal or signals it receives on a different channel or channels from one or more other APs that are within transmission range and with which it is not currently associated. The handoff process can be initiated at the point in time that the signal quality of the current communications link falls below a particular threshold. In order for a wireless communications device to associate with a new AP, it is necessary to first conduct an authentication process and then an association process. At the point that the wireless communications device sends an association request to a new AP, the current AP with which the wireless device has a communications link is free to stop sending frames to the wireless device. At this point, it is essential that the new AP respond very quickly to the wireless communication devices request to associate and that the new communications link is established with a minimum of delay. In practice there are delays, but such delays are not typically noticeable or objectionable to the user. The threshold mentioned above with reference to signal quality can be a signal strength value as measured in decibels or a packet error rate value as measured in bits per second, for instance or the threshold can be the result of a comparison of the current signal quality with a candidate signal quality stored in memory where the threshold is reached a the point the current signal quality falls below a candidate signal quality.

Continuing to refer to the handoff process in more detail, a wireless communications device typically transmits probes on one or more channels in order to receive probe responses from other APs with which it might associate that will permit a higher quality communications link. The operation of transmitting a probe and receiving a probe response for each channel typically occurs between periods of transmission and reception of voice or other packets to or from the AP with which the wireless device is currently associated. Unfortunately, sending such probes in the 802.11a environment is not allowed prior to the wireless device knowing that the channel on which it is sending the probe is available, or radar free. The FCC currently specifies that master devices in the 5 Mhz spectrum must sense the wireless medium for sixty seconds on a channel shared with radar before the device transmits over that channel. This means that either the wireless communications device is responsible to scan each channel for sixty seconds before the handoff process can begin or that the AP is responsible for scanning the medium for available channels. Clearly, it is not practical for the wireless communications device to scan the medium for such a period of time, as this would cause an unacceptable delay in handing off a communications session from one access point to another during the roaming process.

Another problem arises if a slave device is off channel communicating with an AP other than the one it is currently associated. If, during the time that the slave device is off channel, the AP with which it is currently associated transmits a change channel signal, the slave device would not detect this signal and would continue to transmit on the channel in possible conflict with a radar signal.

Generally, an AP in a wireless LAN operating according to the standard 802.11 specification transmits two types of signals that contain all of the information that a wireless communications device needs in order to complete the hand off process. One is a management type frame called a beacon and the other is a control type frame called a probe response and they are collectively referred to as qualified transmissions. As it is necessary for a wireless communications device to transmit a probe signal to an AP in order to receive a probe response from the AP, and as such activity is not permitted in channels shared with radar, it is necessary to implement some method whereby the wireless communications device can rely on a qualified signal, such as a beacon, that can be received without having to actively request it. On the other hand, beacons are only transmitted by AP's infrequently, every 102.4 msec for instance. Consequently, it is necessary for the wireless device to passively scan the medium for some period of time, during periods not otherwise employed by the communications device to transmit or receive frames from the AP with which it is currently associated, to detect a beacon. In other words, the wireless communications device operates in a time-sliced manner to communicate with the AP with which it is currently associated and to scan all of the other channels, both those shared with radar and those not shared with radar, in order to receive a signal indicating that some other channels are available on which to communicate with another AP.

Furthermore, it is important from the perspective of the wireless communications device user that the communications session is of consistently high quality. That is, the audio quality is of high fidelity, that the transmitted or received frames of audio information are not clipped or dropped and that there is no noticeable or only minimal delay added as the result of the hand off process.

In light of the above problems associated with the hand off procedure in a network that shares at least a portion of its frequency band with radar signals, it is desirable that the hand off of a wireless communications device from one AP to another will not result in any noticeable discontinuity in the communication session. Further, it is desirable that the amount of time it takes to complete the hand off of a wireless communications device session from one AP to another AP is predictably and suitably small. Still further, it is required that the slave devices are able to detect a signal from the AP, with which they are associated, to stop transmitting on channels that the master device marks as unavailable.

SUMMARY OF THE INVENTION

I have solved the handoff discontinuity problem by implementing a timer, associated with each available DFS channel, that is started at the point in time that the phone determines that a DFS channel is available. This timer can be reset if the phone receives a qualified transmission over the same DFS channel before it times out. More specifically, in the context of a wireless LAN comprised of at least one access point for communicating with a wireless communications device over at least one channel shared with a higher priority signal, I have invented a method for a wireless communications device to determine an availability of one of the channels shared with the higher priority signal in which the communications device senses the wireless medium on at least one of the channels shared with a higher priority signal in order to detect a qualified transmission; if the communications device receives a qualified transmission it then sets a timer dedicated to this channel; the communications device transmits a signal over this channel and if it receives a response, uses this response to reset the dedicated channel timer and to measure and store an indication of the signal quality associate with the channel.

In another embodiment of my invention, the wireless communications device selects an available channel over which to communicate with an access point by sensing the wireless medium on at least one of the channels shared with the higher priority signal for a qualified transmission; receiving a qualified transmission and setting a timer dedicated to the channel; transmitting at least one signal on the channel over which the qualified transmission was received and transmitting at least one signal on a channel not shared with a higher priority signal; receiving a response over both the channel shared and not shared with the higher priority signal and using this response to reset the timer dedicated to the channel shared with the higher priority signal and measuring and storing an indication of the signal quality associated with both the channel shared and not shared with the higher priority signal.

BRIEF DESCRIPTION OF THE DRAWINGS

FIG. 6b is a continuation of FIG. 5a.

DETAILED DESCRIPTION OF THE INVENTION

Figure 1:
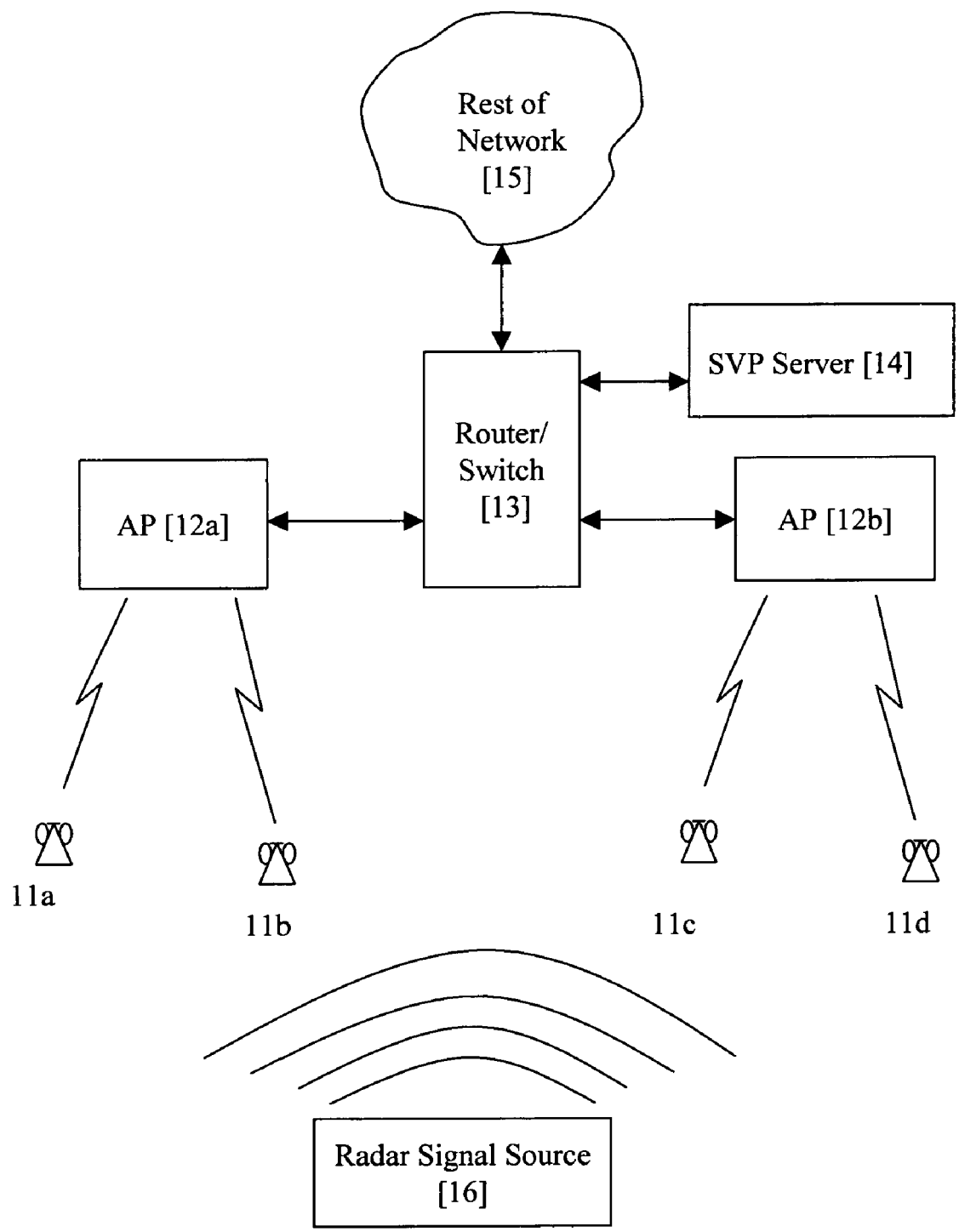
FIG. 1 is a high-level block diagram of a wireless LAN with multiple APs and associated wireless communications devices operating in the presence of a radar source.

We request that the entire contents of U.S. Pat. Nos. 5,673,307 and 6,496,499, which are commonly assigned to the SpectraLink Corporation of Boulder, Colo., be incorporated in their entirety into this application by reference. FIG. 1 shows a wireless local area network 10 (wireless LAN) which operates in the 5 GHz frequency spectrum. The includes a number of wireless communications devices, which in this case are wireless phones 11a, 11b, 11c, and 11d, which are used to transmit and receive frames of voice or data information over the wireless medium to and from access points (AP's) 12a and 12b with which they are associated. In this case, phones 11a and 11b are associated with AP 12a and phones 11c and 11d are associated with AP 12b. The access points generally serve as the wireless phones interface to the wired portion of the network which can operate according to the IEEE 802.3 standard, otherwise commonly known as Ethernet. Suitable APs are sold by many vendors including Cisco, Aruba, or Trapeze Networks. The network device 13, hereinafter referred to as the router, generally operates to receive frames of information from one AP, AP 12a for instance, and to transmit them to another AP, AP 12b for instance, or to the rest of the network 15 according to the destination address information contained in the frame. In general, SVP (SpectraLink Voice Priority) Server 14 functions to regulate or manage the times at which the wireless phones can expect to receive frames of information and it also functions to group frames together in time. Both the timing and grouping functionality provided by the SVP server results in power savings for the wireless phone, which results in longer battery life, and the seamless hand-off of a wireless phone from one AP to another when the wireless phone is roaming. The functionality of the SVP server will not be described in this application in detail as this technology is thoroughly described in the referenced U.S. Pat. No. 6,496,499. It should be understood, however, that the SVP functionality does not have to be provided in the wireless LAN 10 as a separate SVP Server 14, but alternatively, it can be incorporated into an AP or the wireless phones as will be described latter in this application.

Continuing to refer to FIG. 1, the wireless LAN 10 shares the 5 GHz frequency spectrum with radar signals which are represented here as a radar source 16. Radar source 16 may transmit radar signals periodically or continually on one or more channels that the wireless phones and AP's are transmitting or receiving on. Communications devices operating in the 802.11a frequency spectrum typically transmit and receive on twenty three channels, fifteen of which channels are shared with radar. (The channels shared with radar are 5-19 while those not shared with radar are 1-4 and 20-23. In order for the AP's 12a and 12b and the wireless phones 11a, 11b, 11c and 11d to operate in this shared frequency spectrum, a spectrum sharing protocol has been adopted which is referred to as dynamic frequency selection or DFS. This protocol generally requires that a master device will employ a radar interference detection function to monitor the frequency spectrum for at least some specified minimum period of time for an available channel, or a channel that is radar-free, prior to transmitting information over the wireless medium on that channel. During normal operation, the master device will monitor the channel it is currently using continuously for radar, and if it detects a radar signal on one or more channels during this time will instruct all slave devices associated with it, to discontinue transmitting on that channel within a specified period of time, which in this case is ten seconds. During this ten second period, the slave devices are free to associate with some other master device before discontinuing transmission on the current channel. The slave devices should be configured such that they do not transmit signals over the wireless medium on any channel before receiving a signal from the master device indicating which channels are available. The slave device will discontinue all transmission when it is instructed to do so by the master device and will not resume transmitting until it receives the signal from the master device with an indication that channel is again available. In the preferred embodiment of my invention, the phone can be off channel performing some functionality other than communicating with the AP with which it is currently associated. This other functionality can be dynamic channel access (DCA), for instance. During the time the phone is performing the DCA operation, it would not be able to receive a signal from the AP instructing it to stop transmitting on the current channel or to change channel and so any transmission by the phone subsequent to the ten second window could interfere with the operation of a radar device. I have solved this problem by recognizing that it is not necessary for a slave device to receive such a change channel signal from an AP, but instead maintain a ten second timer for each channel shared with radar that is set and reset as will be described later in greater detail with reference to FIG. 5.

Continuing to refer to FIG. 1, the radar source 16 is shown to be periodically or continually transmitting radar signals on one or more channels within range of both AP 12a and 12b and the wireless phones 11a, 11b, 11c and 11d. For the purposes of this description, we assume that the radar source is transmitting on channel 10.

As mentioned above, during normal, non-roaming operation, a slave device, wireless phone 11a of FIG. 1 for instance, might be instructed by a master device, AP 12a for instance, to discontinue transmitting on a particular channel. However, in the event that the wireless phone 11a is moving around in space, or roaming, it is likely that it will start moving out of range of AP 12a, and as the result of moving out of range the quality of the RF link between the phone and the AP will deteriorate. As long as the phone is in a call, it is continuously scanning the channel looking for another AP with which to associate where the RF link is of higher or acceptable quality. One method by which a phone can determine which other AP's can provide a higher quality RF link and then quickly be handed off from one AP to another is the subject of U.S. Pat. No. 5,673,307 which is incorporated into this application by reference. Regardless, most methods for handing off a communications session from one AP to another are fundamentally similar. Namely, as the phone 11a determines that it is moving out of range of AP 12a, it transmits probes, when it can, on channels other than the one it is currently transmitting and receiving frames from AP 12a. In the event that the probe is received by AP 12b, it will respond by transmitting a probe response which the phone can, among other things, use to calculate the signal quality and therefore the quality of a potential RF link with AP 12b. At the point in time that the quality of the RF link between the phone and AP 12a falls below a certain threshold level, the phone will initiate a new session with the best AP with which it can associate, or the AP with which it can establish the highest quality RF link, which in this case could be AP 12b. The threshold mentioned above with reference to signal quality can be a signal strength value as measured in decibels or a packet error rate value or the threshold can be the result of a comparison of the current signal quality with a candidate signal quality stored in memory where the threshold is reached a the point the current signal quality falls below a candidate signal quality The quality of an RF link, commonly referred to as the signal quality, can be measured in a number of different ways. For instance, the phone can measure the average signal strength in decibels over time or at a particular point in time and/or the phone can measure the packet error rate of a channel which equates to the success rate with which the AP responds to probe attempts sent to it by a phone. Regardless, at the point that the phone starts signaling AP 12b that it would like to associate with it, AP 12a is free to stop transmitting frames of information to the phone. In a wireless LAN that is not sharing its frequency spectrum with radar, and so not required to conduct the DFS process mentioned earlier, roaming from one AP to another AP can be seamless from the perspective of the user. In other words, the user does not perceive a discontinuity or any degradation in the quality of their communications session. On the other hand, in a wireless LAN that does share at least some portion of its spectrum with radar, the requirements of the DFS protocol can cause significant delays during the hand off process, resulting in a discontinuity during a communications session that is noticeable to the user. This discontinuity may be a longer or shorter period of time depending upon the speed with which the phone is roaming. Specifically, this discontinuity is the result of the DFS requirement that a slave wireless phone not transmit on any channel shared with radar until it receives an instruction from a master AP that a channel shared with radar is available.

Figure 2:
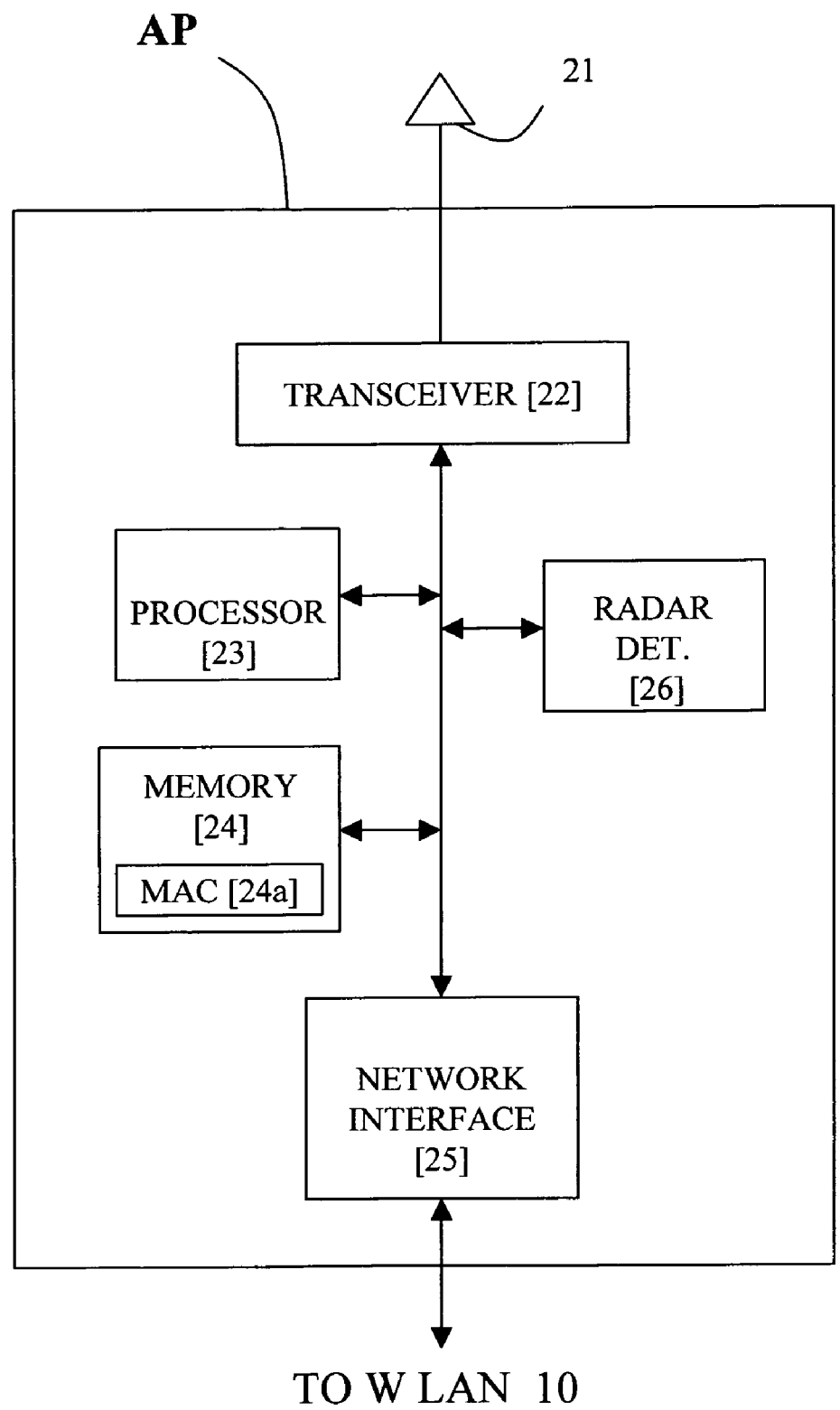
FIG. 2 is a high-level functional block diagram of an AP showing radar detection and notification capability.

FIG. 2 is a functional block diagram of one of the AP's 12a or 12b of the wireless LAN 10 in FIG. 1. Any commercially available AP that operates in accordance with the IEEE 802.11a standard can be used in the wireless LAN and are well know to those in the field of wireless communications. The AP generally operates to transmit or receive frames of information to or from a wireless phone. If receiving frames from a wireless phone, the frames are placed into a queue or queues where they are available to be transmitted to a destination wired device on the wireless LAN 10. More specifically, the AP is designed to receive the frames in the 802.11 data frame format, for instance, and converts the frames of information into the well known 802.3 Ethernet format which can then be transmitted over the Ethernet to the wired devices on the wireless LAN. The AP of FIG. 2 has an antenna 21, transceiver 22, processor 23, memory 24, Ethernet interface 25 and radar detector 36. The antenna 21 operates to propagate wireless voice signals and is the initial reception point for incoming wireless voice signals. The antenna is connected to a transceiver 22, which operates to demodulate the signals containing voice information received from the antenna or to modulate signals prior to their being sent to the antenna. The transceiver 22 is connected over parallel bus 27 to a processor 23 and memory 24. The processor generally functions, in conjunction with memory 26, to manage the operation of the AP. More specifically, memory 24 is used to store a software module that implements medium access control (MAC) functionality. The fundamental medium access protocol specified by 802.11 is a distributed coordination function (DCF), known as carrier sense multiple access with collision avoidance (CSMA/CA). In operation, the CSMA/CA protocol reduces the probability that collisions will occur between two or more wireless devices that have been waiting for the medium to become idle. A distributed carrier sense strategy is employed where each wireless device in the LAN monitors the state of the medium and at the point that the medium becomes idle, the device starts a random back off procedure which must be completed before it gains access to the medium. The use of this random back off procedure decreases the probability that collisions will occur.

As mentioned previously with respect to FIG. 1, network devices configured to be the master devices are AP 12a and 12b, and they are required to be able to detect the presence of radar signals in the 5 GHz frequency spectrum and to clear any channel on which a radar signal is present by, for instance, transmitting a "change channel" signal to all phones currently associated with it. This is referred to as DFS and both AP 12a and 12b include a radar detector 26 that operates to detect the presence of radar signals. There are a number of different techniques that can be used for detecting radar signals and several commercially available AP's incorporate this, so we will not discuss how radar signals are detected here, nor will we discuss how an AP generates a signal notifying other wireless devices in the wireless LAN that a radar signal is present. All of this detection and notification functionality is provided by AP's and has no bearing on the specifics of the embodiment of our invention. Finally, with reference to FIG. 2, the 802.11 to 802.3 interface 25 generally operates to convert frames of information from the 802.11 format to the Ethernet format and transmit these frames to the wireless LAN 10.

Figure 3:
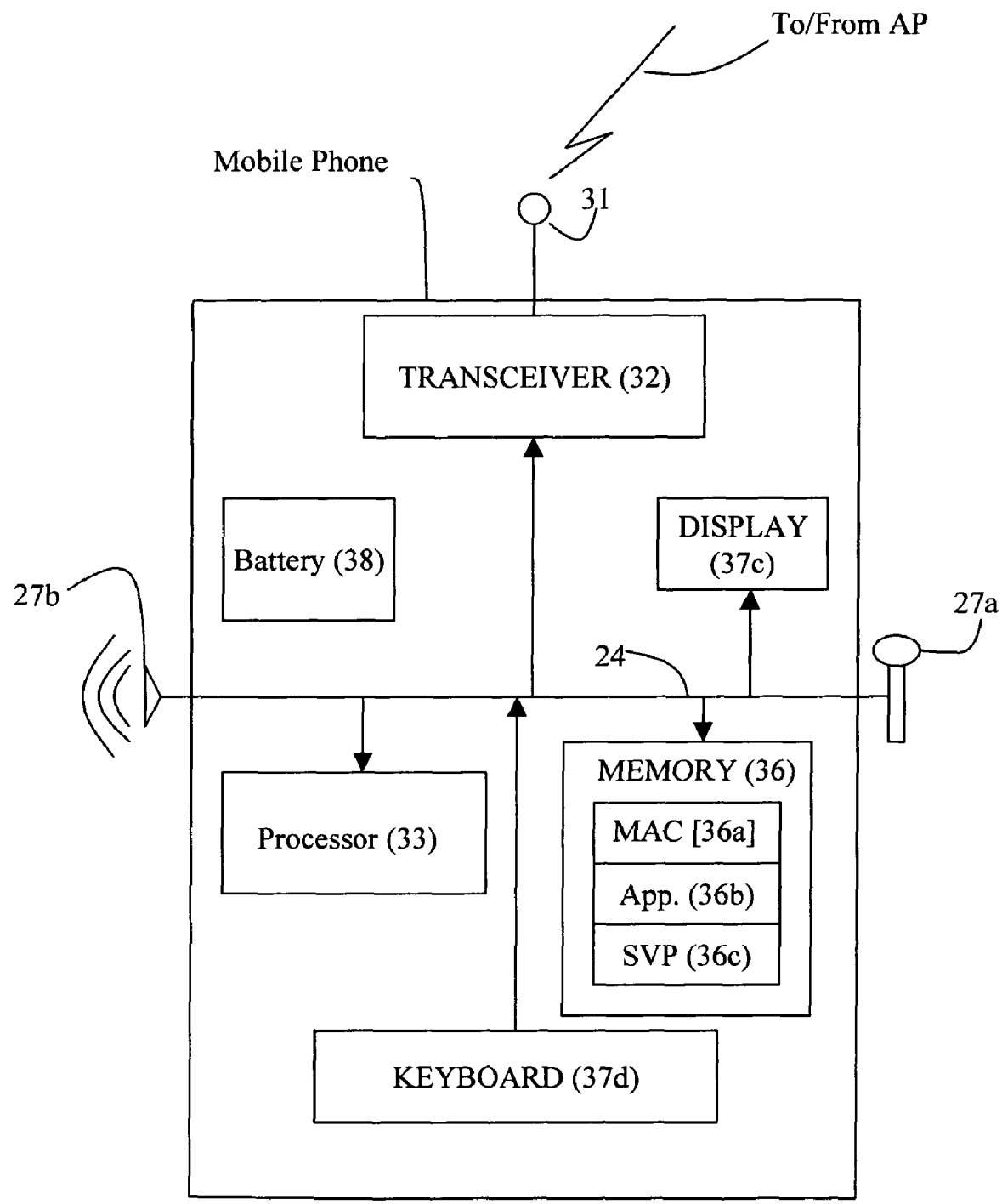
FIG. 3 is a high-level functional block diagram of a wireless communications device configured to operate according to the 802.11a standard.

FIG. 3 is a functional block diagram showing a wireless phone suitable for use with our invention and for the purposes of this description can represent any one of the wireless phones 11a, 11b, 11c and 11d shown in FIG. 1. The wireless phone includes an antenna 31, which operates to propagate wireless signals and is the initial reception point for incoming wireless signals. The antenna is connected to a transceiver 32, which operates to demodulate the signals containing voice information received from the antenna or to modulate signals prior to their being sent to the antenna. The transceiver is connected over a bus 34 to, a processor 33, memory 36, microphone 37a, speaker 37b, display 37c and keyboard 37d. The processor 33 generally functions in conjunction with memory 36, and under the control of a radio module and network module, referred to here collectively as the telephony application 36b and which is stored in the memory, to perform certain functions necessary for the operation of the phone. The telephony application 36b, which is comprised of a radio module and a network module, generally controls such functionality as initiating, maintaining, and tearing down communications sessions. The hand off procedure and the routine/procedure employed to determine which channels have the highest quality signals as described above with reference to FIG. 1, are also implemented in the telephony application. Specifically, the telephony application controls the operation of the wireless phone such that it actively transmits probes on channels not shared with radar and passively senses the medium on channels shared with radar at least for as long as it takes to determine that the channels shared with radar are available, at which point they can be actively scanned. Further, the telephony application can be configured such that it causes the wireless phone to actively scan during one service period and passively scan during another, next service period. This service period with be described later in more detail with reference to FIG. 5.

Continuing to refer to FIG. 3, the memory 36 can be an EEPROM, RAM or flash memory and is generally employed to store the telephony application, as previously mentioned, and to store a software module that implements medium access control (MAC) functionality which is the essentially the same as the MAC functionality described earlier with reference to FIG. 2. The SVP module 36c stored in the memory 36 provides the same SVP functionality as described earlier with reference to FIG. 1 and so we will not describe its operation again here.

As mentioned previously, the wireless phone is alternately conducting both the passive and active scanning operations and transmitting and receiving frames of voice or data information during a single service period, or the period of time from the beginning of one transmit/receive operation to the beginning of the next transmit/receive operation, in a time-sliced manner. The phone is able to both support a communications session and scan the medium for available channels on alternative APs in a time-sliced manner without any noticeable session discontinuity because it "knows", due to the SVP functionality, when to expect voice frames from the AP with which it is associated. Provided the DCA cycle is relatively short, which in one embodiment of my invention is approximately three seconds, it is probable that the wireless phone user will not notice any break in the communications session regardless of how rapidly they are roaming from one AP to another AP. However, if the DCA cycle takes much longer than five seconds or six seconds, the hand off process is likely not to be either regular or seamless in nature. Also, as mentioned above, if the phone is off channel conducting DCA, during the time a channel change signal is transmitted by an AP, it would not see the command and therefore not stop transmitting on the channel within the specified period of time. I have solved this problem by maintaining a timer, dedicated to each channel shared with radar, that is set or reset each time the phone receives a qualified transmission. More specifically, during the passive scanning phase of a DCA cycle, the phone initiates a ten second timer for each channel shared with radar for which it receives a qualified transmission. These timers are reset each time the phone receives a qualified transmission during a subsequent passive or active scanning phase of the DCA cycle.

Regardless of the sensing technique (passive or active) utilized or of the type of signal the wireless phone receives, and depending upon whether the phone is in a communication session or not, the functionality that the SVP server 14 of FIG. 1 provides can be an important element to the overall method of our invention. Generally, as mentioned earlier, the SVP server functions to time and group the delivery of frames of voice information to the wireless phones. The effect of this predictable timing and grouping of the frame delivery to the wireless phone results in their having more time during a frame to do such things as passively sensing on other channels for alternative AP's to associate with. On the other hand, if the phone is not in an active communication session with an AP, the SVP server has no effect on the process. Also, as previously mentioned, as a consequence of employing this SVP functionality, it is possible that a phone will not receive a "change channel" signal send from the AP with which it is currently associated.

As previously described with reference to FIG. 1, as a result of sharing the 5 GHz spectrum with radar and the requirement to implement the DFS protocol, the hand off process is not likely to be either regular or seamless in nature. Specifically, the requirement of the wireless phone to passively sense the medium on channels shared with radar introduces unacceptable delay to the hand off process as well as the process for initiating a communications session, which is perceived by the user as a discontinuity or delay in the communication session. Furthermore, if the phone is off channel during the time a change channel signal is transmitted, it will not stop transmitting on that channel. As previously mentioned, I have solved these problems with the introduction of a ten second timer, dedicated to each available channel shared with radar. As long as the ten second timer period has not expired, the phone can use the channel for communications on a limited basis. Use of this timer reduces the number of times each DFS channel needs to be scanned, thereby reducing the amount of time it takes to perform a DCA cycle which results in the phone being much more responsive to roaming situations. The DFS channels can be scanned fewer times during each DCA cycle, as once a channel has been determined to be available, it is then possible for the phone to transmit probes and receive probe responses over the channel which has the effect of resetting the ten second timer and therefore confirming the availability of the channel. Fewer scans of each channel result in more DCA cycles being performed and the cumulative probability that an available channel will be detected improves. Also, the timer strategy permits the phone to go off channel to perform DCA or other management functions and not have to account for missed change channel signals from the AP with which it is currently associated.

Assuming that a communications session is already established, our method for scanning the medium for available channels is performed without interrupting the flow of the communications session and the two processes of scanning and running the session are performed in a time-sliced manner. In the preferred embodiment of our invention, we combine the SVP functionality described earlier with reference to FIG. 1 with the ten second timer dedicated to each DFS channel in order to minimize the total time it takes the wireless phone to detect an suitable/available channel and then conduct the hand off procedure.

Figure 4:
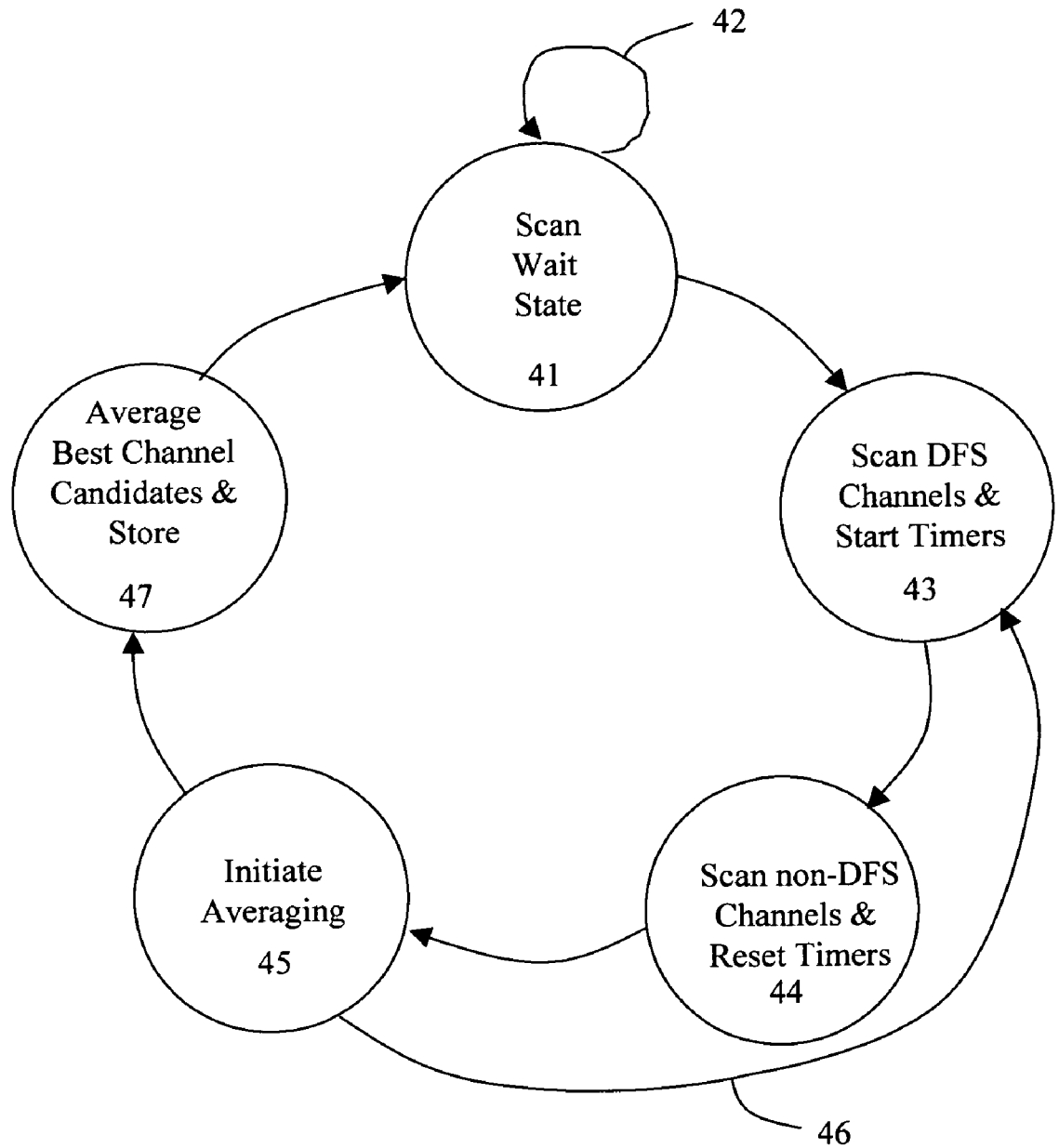
FIG. 4 is a state diagram of state machine 40.

FIG. 4 is a state diagram of the DCA cycle mentioned previously with reference to FIG. 1. As previously mentioned above, during the period of time that the phone is not communicating with the AP with which it is currently associated, it can perform other functionality on other channels, which for example can be DCA functionality. In the first DCA state 41, the phone can be programmed to perform a looping function 42 for a period of time. This state can loop for some number of service periods of approximately 15 milliseconds each. Regardless of how the phone is programmed to start sensing the wireless medium, when the condition of the wait state 41 is met, the state machine comes out of the looping function and transitions to the next state 43 at which point the DCA process starts to passively scan all of the DFS channels (unless it is currently on a DFS channel, in which case it scan all but one of the DFS channels) to detect a qualified transmission from an AP other than the one it is currently associated. As the phone detects a qualified transmission on any particular DFS channel, the phone application immediately starts and runs a ten second timer for that channel. At the point that the phone has passively scanned all of the channels shared with radar and identified and stored some number of these channels which are available, the DCA process transitions to state 44, during which the DCA process will then proceed to probe or actively scan all of the DFS and non-DFS channels. During this state, any AP that receives a probe would typically respond by transmitting a probe response. The phone receives the probe response and uses it to obtain a signal strength value for each channel over which a probe response is received and this value associated with each channel is stored in memory. The probe responses received over DFS channels are consider by the phone to be qualified transmissions, and as such the phone resets any of the timers set in the earlier state 43. As each channel is scanned three times in the preferred embodiment of my invention, up to three separate channel signal strength values can be stored in memory. At the point that the phone has actively scanned all of the channels the DCA process transitions to state 45, at which point it examines memory to see how many candidate Aps where detected. If no Aps were detected, the process transitions back, in 46, to state 43, otherwise if at least one candidate AP was detected the process transitions to state 47 where the results of each scan cycle are averaged which results in an average signal strength or signal quality for the one candidate channel. In the preferred embodiment of my invention, the phone will average all of the signals on all of the channels it detected a probe response and then select the channels with signals that have the four highest signal qualities. These four signal quality values are then stored in memory for use by the phone during a roaming operation.

At the point in time that the phone determines that the signal quality of the communications link between it and the access point with which it is currently associated has fallen below a threshold, it will select a candidate from the results of state 47 in FIG. 4 above, with the highest signal quality or at least with a better signal quality than that of the phones current communications link, that is stored in memory with which to send an association request to another access point. Assuming that the request is granted, the phone will then become associated with the new access point. This process is commonly referred to as a dynamic channel access (DCA) and one ore more DCA cycles may be needed before a suitable channel is found over which to continue the communications session.

Figure 5:
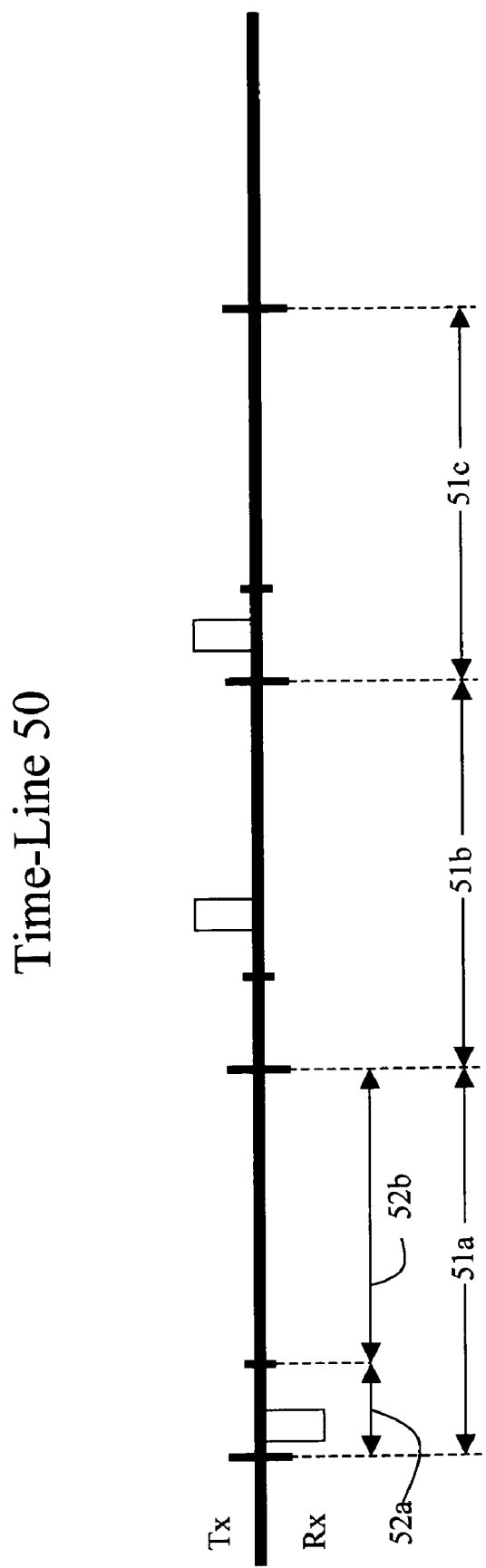
FIG. 5 is a time line showing the wireless communications device sensing the wireless medium while turned on but not in a communications session.

FIG. 5 is a time-line 50 showing three sequential service periods of a wireless phone that is in an active call with the currently associated AP, AP 12a for instance. The period during which the wireless phone is configured to both communicate with the AP with which it is associated and to passively scan the medium to detect available DFS channels or to actively scan the medium in order to receive response signals on which the quality of the signal is measured and stored is referred to here as service period 51. The duration of each service period in the preferred embodiment of our invention is either 20 ms or 30 mS, but this period could be either of longer or shorter duration and is not critical to the operation of our invention. Each service period is divided into two sub-periods, which for service period 51 are sub-period 52a and 52b. In this case, during sub-period 52a, the wireless phone communicates with the AP with which it is currently associated, AP 12*a* for instance. This communication with AP 12*a* can be such activity as transmitting and receiving frames of audio or control information. For the purposes of this description, we will assume that sub-period 52*a* is 5 ms in duration, but it can be of longer or shorter duration. As referred to previously, the SVP functionality residing either on SVP server 14 of FIG. 1 or SVP application 36*c* of FIG. 3 serves to group traffic from an AP, AP 12*a* for instance, to a wireless phone, phone 11*a* for instance and send this traffic to the wireless phone at regularly scheduled times which could correspond to sub-period 52*a*, for instance. In this way, it is possible to minimize the duration of sub-period 52*a* and so maximize the time the wireless phone can spend off channel on activity other than communicating with AP 12*a*, such as in this case DCA cycles. For the purpose of this description, we assume that sub-period 52*b* is 15 ms in duration, but as with sub-period 52*a* can be of longer or shorter duration. The wireless phone is able to utilize this 15 ms time period to, among other things scan the wireless medium for alternate AP's with which to associate or, in this case, passively sense the medium looking for other available channels.

In the preferred embodiment of our invention, I have elected to scan each DFS channel three times. Passively scanning each DFS channel three times gives the phone a forty percent chance of detecting a beacon in the first scan cycle (three scan/service periods per DFS channel). The phone can be programmed to scan each channel more than three times to improve the probability that the phone would detect a beacon in the first scan cycle, but this would also lengthen the DCA cycle time, which would result in the phone being less responsive to the dynamics of roaming. Regardless, it would be possible to scan each channel more than three times without seriously denigrating the quality of the communications session depending, of course, on the speed with which the phone was roaming through the network or from AP to AP (probably depends upon the environment in which the phone is used . . . using phone while on a fork lift that was traveling at a high speed would dictate that the scan cycle should be shorter).

As described above, with reference to FIG. 5, each sub-period 42*b* is 15 ms in length and is employed to, among other things, support DCA functionality. In this case, that functionality can be passively scanning the wireless medium to detect a beacon transmitted by an AP. As my preferred embodiment conducts three passive scan cycles on each DFS channel during a single DCA cycle, the time the phone spends sensing on each DFS channel is 45 ms. Assuming for this description that a beacon is transmitted periodically every 102.4 ms, there is approximately a 44% probability that the phone will detect a beacon during the first DCA cycle which I determined was good enough to identify a sufficient number of channels to probe in order to determine which channels are suitable candidates over which to establish a new communications session. However, since we need to hear the entire beacon, it is necessary to subtract the beacon duration, 750 usec for instance, from the 15 msec sub-period 42*b* which leaves us with an effective scan time during this sub-period of 14.25 ms. So now three passive scan cycles sense the wireless medium for 42.75 ms which when divided by the 102.4 ms beacon period leaves approximately 42% probability that a beacon will be detected during the scan cycle. From another perspective, the chances of missing a 750 usec beacon are sixty percent in the first scan cycle.

Continuing with the above discussion, if we configure the wireless phone to scan the medium for another cycle, or another 45 msec, the probability of missing a beacon is calculated by multiplying 60% by 60% and the probability of missing a beacon drops to 36%. If yet another scan cycle is added the probability of missing a beacon falls to 21.6% which I have experimentally determined to be low enough so that the quality of a communication session is not compromised. However, as mentioned above, the phone can easily be programmed to scan the DFS channel more or less than three times depending upon the demands of the environment in which the phone is being used.

Figure 6A:
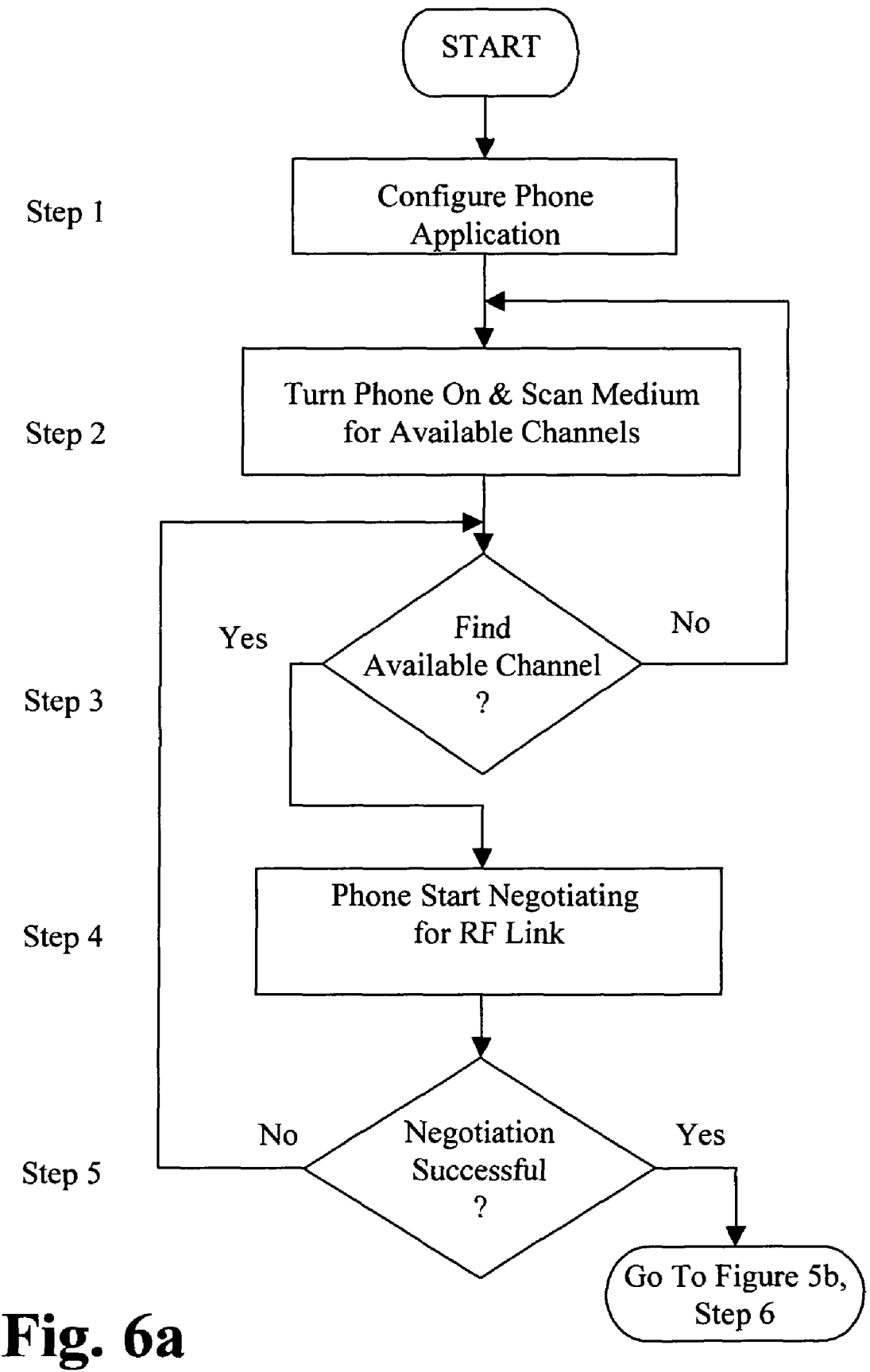
FIG. 6a is a logical flow diagram of the preferred embodiment of our invention.
Figure 6B:
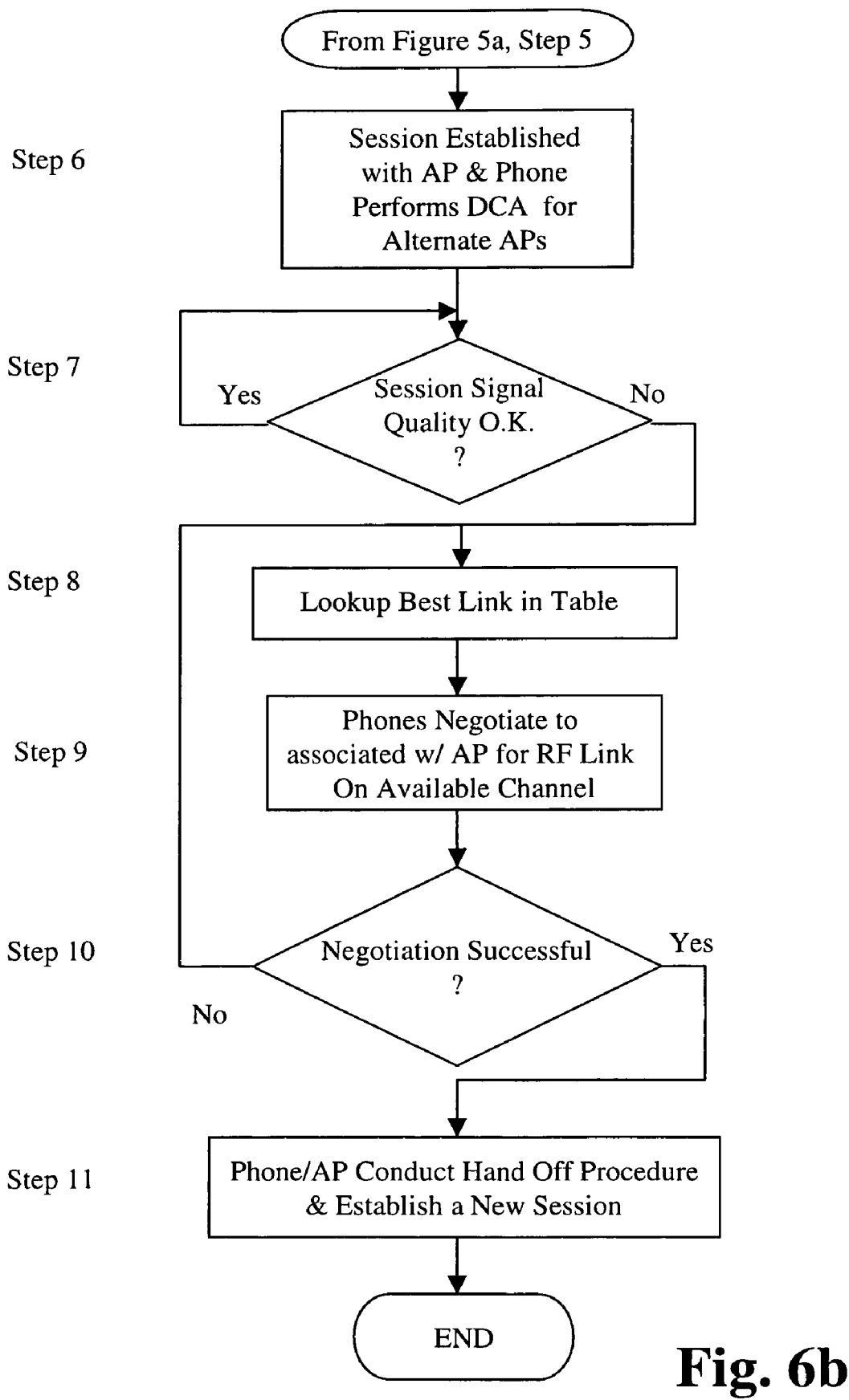

FIGS. 6*a* and 6*b* represent a high level logical flow diagram of the preferred embodiment of the method of our invention. As was described above, a seamless hand off process can only be realized provided there is not undue delay between the time one AP, the current AP the wireless phone is associated with, stops transmitting to the wireless phone and when the AP with which the wireless phone is attempting to associate starts transmitting frames. We have found that if the DCA cycle can be consistently performed in approximately 3 to 5 seconds, the user will not experience any objectionable discontinuity in their communications session. We will now describe, starting with reference to FIG. 6*a*, how the wireless phone determines which channels are available and suitable for conducting communications session over and how the phone selects the best channel over which to conduct a session. In step 1, the phone application is configured such that it passively scans each DFS channel three times during each DCA cycle looking for available DFS channels over which it could establish a communications session. The application sets dedicated DFS channel timers whenever the phone detects a qualified transmission from another AP and the detected, available channels are stored in memory. Step 2 generally equates to the operation of the DCA state machine as described above in detail with respect to FIG. 4. In step 2, the phone proceeds to actively scan all channels, both those available DFS channels and all non-DFS channels with the ultimate purpose of, in step 3, receiving a probe response which is used to determine the signal quality over each channel. The value of the signal quality for each detected channel is stored in memory for later use. If the wireless phone receives a probe response over at least one channel, and determines that the signal on the channel is of high enough quality to conduct a communications session, it can start negotiating with the AP, AP 12*a* for instance, that is transmitting on that channel to become associated with it. If, for some reason the wireless phone does not sense a probe response, then it would return to step 2 and starts the scanning process over again. In step 4, the wireless phone starts negotiating with AP 12*a* to establish an RF link as described earlier with reference to FIG. 1. If this negotiation with the new AP 12*a* is successful in step 5, the process proceeds to step 6 of FIG. 6*b*, otherwise the process returns to step 3.

With reference to FIG. 6*b*, we will now describe the process the wireless phone follows during roaming to maintain the existing communications session while scanning for suitable channels on alternative APs, AP 12*b* for instance, with which to establish a new RF link. In step 6, the communications session with AP 12*a* is established and the wireless phone 11*a* proceeds to receive frames from and transmit frames to the AP. During the time the wireless phone is in this communications session it may continually perform DCA cycles in order to monitor and store, in a table in memory 36 of FIG. 3, a measure of the quality of the channels/RF links with the AP it is currently associated with and all other APs within range, such as AP 12*b* for instance. The wireless phone performs this RF link signal quality monitoring as described in step 2 of FIG. 5*a*. In step 7, if the channel signal quality with AP 12*a*, as measure by signal strength, or some other measure falls below the quality of the signal received from any other AP, AP 12*b* in this case, the process proceeds to step 8 where the phone selects a channel with the highest signal quality value from the table in memory and uses this channel to associate with another AP. On the other hand if, in step 7, the channel signal quality between the phone and the AP with which it is currently associate with is determined to be the best communication link available, the process loops on step 7. Continuing to step 9, the wireless phone starts negotiating to associate with AP 12b. We have generally described the association process earlier with reference to FIG. 1 and this process is well documented in the standard IEEE 802.11 specification and well known to those in the field of wireless, wireless communications.

The process described above with reference to steps 6, 7, 8, & 9 needs to be accomplished within a relatively short period of time when the wireless phone is roaming around in order for the communications session to continue uninterrupted. This period of time can vary depending upon the speed with which the phone is roaming, but under normal roaming conditions, with APs distributed in space according to manufacturers specifications, a communications session will not experience any discontinuity provided that it does not take longer than 5 seconds to scan the medium looking for available, alternative APs with which to associate. As previously mentioned, this timing is not an issue when operating in an environment in which the frequency band is not being shared with radar. However, in the presence of radar, as described previously with reference to FIG. 1, it does take longer for the phone to find alternative APs with which to associate. Continuing to refer to FIG. 5b, provided that the process of negotiating to associate with AP 12b is completed successfully, the process proceeds to step 11 where AP 12a discontinues sending frames to wireless phone 11a and AP 12b starts sending frames to wireless phone 11a at which point the communications session continues and hand off process is complete.

I claim:

1. In a wireless local area communications network comprised of at least one access point for communicating with a wireless communications device over at least one channel shared with a radar signal, a method for the wireless communications device to determine an availability of the at least one channel shared with the radar signal comprising the steps of:
the wireless communications device sensing the wireless medium on at least one of the channels shared with the radar signal for a qualified transmission;
the wireless communications device receiving a qualified transmission over one of the channels shared with the radar signal and setting a timer dedicated to the channel;
the wireless communications device transmitting at least one probe signal on the channel over which the qualified transmission was received only while the timer dedicated to the channel has not expired; and
the at least one wireless communications device receiving a probe response signal to the at least one transmitted probe signal on the channel over which the qualified transmission was received, using the probe response signal to reset the timer dedicated to the channel and to measure and store an indication of a signal quality associated with the channel;
the wireless communications device transitioning into the call state, transmitting an association request to the at least one access point over the channel and the wireless communications device receiving an association response from the at least one access point over the channel; and
the wireless communications device establishing a communications session with the at least one access point over the channel only during the time that the timer dedicated to the channel has not expired.

2. The method of claim 1 wherein the wireless communications device senses the wireless medium for at least one dynamic channel access cycle.

3. The method of claim 1 wherein the indication of signal quality is one or both of a measured signal strength and a measured packet error rate.

4. The method of claim 1 wherein the higher priority signal is a radar signal.

5. The method of claim 1 wherein the wireless communications device is a mobile phone.

6. The method of claim 1 wherein the qualified transmission is one of a beacon and a directed packet.

7. In a wireless local area communications network comprised of a plurality of access points for communicating with a plurality of wireless communications devices over a plurality of channels each shared with a radar signal, a method for at least one of the wireless communications devices to determine availability of at least one of the plurality of the channels shared with the radar signal for communicating with at least one of the plural access points comprising:
the wireless communications device sensing the wireless medium on at least one of the channels shared with the radar signal for a qualified transmission;
the wireless communications device receiving a qualified transmission over one of the channels shared with the radar signal and setting a timer dedicated to the channel;
the wireless communications device transmitting at least one probe signal on the channel over which the qualified transmission was received only while the timer dedicated to the channel has not expired;
the wireless communications device receiving a probe signal to the transmitted at least one probe signal on the channel over which the qualified transmission was received, using the probe response signal to reset the timer dedicated to the channel and to measure and store an indication of the signal quality associated with the channel;
the wireless communications device transitioning into the call state;
the wireless communications device transmitting an association request to at least one of the plural access points on the channel over which the qualified transmission was received;
the wireless communications device receiving an association response from the at least one access point over the channel over which the qualified transmission was received; and
the wireless communications device establishing a communications session with the at least one access point over the channel over which the qualified transmission was received only during the time that the timer dedicated to the channel has not expired.

8. The method of claim 7 wherein the wireless communications device senses the wireless medium for at least one dynamic channel access cycle.

9. The method of claim 7 wherein the indication of signal quality is one or both of a measured signal strength and a measured bit error rate.

10. The method of claim 7 wherein the wireless communications device is a mobile phone.

11. The method of claim 7 wherein the qualified transmission one of a beacon and a directed packet.

12. In a wireless local area communications network comprised of at least one access point for communicating with a wireless communications device over at least one channel shared with a radar signal and at least one channel not shared with a radar signal method for the wireless communications device selecting a channel over which to communicate with the access point comprising the steps of:

the wireless communications device sensing the wireless medium on at least one of the channels shared with the radar signal for a qualified transmission;

the wireless communications device radar priority signal and setting a timer dedicated to the channel;

the wireless communications device transmitting at least one probe signal on the channel over which the qualified transmission was received only while the timer has not expired and transmitting at least one probe signal on a channel not shared with a radar signal;

the at least one wireless communications device receiving a probe response signal to the transmitted probe signals over the channel shared with the radar signal and the channel not shared with the radar signal, using the probe response signal to reset the timer dedicated to the channel shared with the higher priority signal and to measure and store an indication of the signal quality associated with both the channel shared with the radar signal and the channel not shared with the radar signal;

the wireless communications device transitioning into the call state;

the wireless communications device transmitting an association request to at least one of the plural access points over the channel with the highest stored indication of signal quality;

the wireless communications device receiving an association response from the at least one access point over the channel with the highest stored indication of signal quality; and the wireless communications device establishing a communications session with the at least one access point over the channel with the highest stored indication of signal quality.

13. The method of claim 12 wherein the wireless communications device senses the wireless medium for at least one dynamic channel access cycle.

14. The method of claim 12 wherein the indication of signal quality is one or both of a measured signal strength and a measured bit error rate.

15. The method of claim 12 wherein the higher priority signal is a radar signal.

16. The method of claim 12 wherein the wireless communications device is a mobile phone.

17. The method of claim 12 wherein the qualified transmission is one of a beacon and a directed packet.

* * * * *